United States Patent
Yajima

(10) Patent No.: US 7,489,059 B2
(45) Date of Patent: Feb. 10, 2009

(54) MOTOR MOUNTED WITH IMPROVED DYNAMIC PRESSURE FLUID BEARING MECHANISM

(75) Inventor: Teruyuki Yajima, Fujieda (JP)

(73) Assignee: Victor Company of Japan, Limited, Yokohama (JP)

( * ) Notice: Subject to any disclaimer, the term of this patent is extended or adjusted under 35 U.S.C. 154(b) by 256 days.

(21) Appl. No.: 11/592,254

(22) Filed: Nov. 3, 2006

(65) Prior Publication Data
US 2007/0176503 A1 Aug. 2, 2007

(30) Foreign Application Priority Data
Jan. 30, 2006 (JP) .............. 2006-020356

(51) Int. Cl.
H02K 5/16 (2006.01)
(52) U.S. Cl. ...................... 310/90; 310/67 R
(58) Field of Classification Search ............. 310/67 R, 310/89–90; 384/107, 112; 360/99.08
See application file for complete search history.

(56) References Cited

U.S. PATENT DOCUMENTS

| | | | | |
|---|---|---|---|---|
| 7,265,469 | B2* | 9/2007 | Kodama | 310/90 |
| 7,285,886 | B2* | 10/2007 | Kodama | 310/90 |
| 7,399,120 | B2* | 7/2008 | Yamada | 384/107 |
| 2006/0170300 | A1* | 8/2006 | Kodama | 310/90 |
| 2006/0267434 | A1* | 11/2006 | Kodama | 310/90 |
| 2007/0001531 | A1* | 1/2007 | Nagai | 310/156.04 |
| 2007/0013249 | A1* | 1/2007 | Engesser et al. | 310/90 |
| 2007/0024136 | A1* | 2/2007 | Saito et al. | 310/90 |
| 2007/0145837 | A1* | 6/2007 | Herndon et al. | 310/67 R |

FOREIGN PATENT DOCUMENTS

JP 2004-271820 9/2004

* cited by examiner

Primary Examiner—Thanh Lam
(74) Attorney, Agent, or Firm—Connolly Bove Lodge & Hutz LLP

(57) ABSTRACT

A motor is composed of a rotor and a stator. The rotor includes a shaft, a hub having a cylindrical wall and a thrust ring. The stator includes a motor base, an inner seal and a sleeve having a flange section. The rotor is supported in a thrust direction by a first thrust dynamic pressure fluid bearing constituted by a top surface of the thrust ring, a surface of the flange section with having a first gap between them, and lubrication fluid filled in the first gap and a second thrust dynamic pressure fluid bearing constituted by a bottom surface of the thrust ring, an end surface of the inner seal with having a second gap between them, and the lubrication fluid filled in the second gap, and supported in a radial direction by a radial dynamic pressure fluid bearing constituted by an inner circumferential surface of the sleeve, an outer circumferential surface of the shaft with having a third gap between them, and the lubrication fluid filled in the third gap. The motor is further composed of a taper seal section constituted by an inner circumferential surface of the cylindrical wall and an outer circumferential surface of the inner seal, a main lubrication route linking the taper seal section, the second gap, the first gap and the third gap, and a bypass route linking the third gap and an intermediate point between the second and first gaps, wherein both routes are filled with the lubrication fluid.

2 Claims, 4 Drawing Sheets

MOTOR MOUNTED WITH IMPROVED DYNAMIC PRESSURE FLUID BEARING MECHANISM

BACKGROUND OF THE INVENTION

1. Field of the Invention

The present invention relates to a motor, particularly, relates to a motor mounted with an improved dynamic pressure fluid bearing mechanism.

2. Description of the Related Art

It has been common to a motor mounted with a dynamic pressure fluid bearing in the past that the motor was constituted by a pair of radial dynamic pressure fluid bearings provided in respective positions isolated from each other in the axial direction and a taper seal section for sealing lubrication fluid in the dynamic pressure fluid bearings, wherein the pair of radial dynamic pressure fluid bearings and the taper seal section were disposed so as to be in series in the axial direction.

Accordingly, there existed a problem such that a total thickness of the motor or a total length of the motor in the axial direction was hardly thinned or shortened. In order to solve the problem, the Japanese publication of unexamined patent applications No. 2004-270820 disclosed a motor.

The motor disclosed in the Japanese publication of unexamined patent applications No. 2004-270820 is constituted as mentioned below (see FIG. 1 in the publication No. 2004-270820).

More specifically, in the motor, a radial dynamic pressure fluid bearing is constituted by a shaft and a sleeve, which supports the shaft.

Further, one pair of radial dynamic pressure fluid bearings is provided in isolated positions from each other in the axial direction.

Furthermore, either one surface of a top end surface of the sleeve and a bottom end surface of a hub, which confront with each other, is provided with a thrust dynamic pressure groove for generating dynamic pressure, and resulting in constituting a thrust dynamic pressure fluid bearing. The thrust dynamic pressure groove generates dynamic pressure or force directed toward a direction of so-called "pump-in" with respect to lubrication fluid when a rotor of the motor rotates. The force in the "pump-in" direction acts on the lubrication fluid and increases pressure of the lubrication fluid totally.

Accordingly, first force acts on a hub and a motor base respectively in a direction of separating the hub and the motor base from each other when the rotor of the motor rotates.

On the other hand, a yoke in an annular shape made from soft magnetic material is disposed on a motor base, and a magnet in a ring shape is provided on the hub so as to confront with the yoke. By suction power that interacts between the yoke and the magnet, second force, which directs the hub and the motor base toward a direction of approaching with respect to each other, is applied to the hub and the motor base so as to oppose the first force.

Accordingly, by balancing the first force and the second force, the rotor of the motor is made to rise and rotate with respect to the stator.

In the motor constituted by the above-mentioned configurations, a taper seal section is disposed outside the sleeve. In other words, the taper seal section is disposed in parallel with the radial dynamic pressure fluid bearing in the axial direction not in series with the radial dynamic pressure fluid bearing.

Accordingly, a length of the motor in the axial direction results in being able to be shortened.

Further, the sleeve is provided with a through hole that is bored in the axial direction. The through hole links both outermost sides of the pair of radial dynamic pressure fluid bearings in the axial direction. Consequently, pressure of the lubrication fluid propagates through the through hole and the pressure is averaged within the radial dynamic pressure fluid bearings in total, even though pressure of the radial dynamic pressure fluid bearings is likely to be unbalanced by disturbance.

Accordingly, the pressure balance is never disturbed in the motor.

With paying attention to force or pressure in the thrust direction that is generated in the conventional motor, force, which directs the hub toward a direction of leaving from the motor base or an elongation direction, depends only on pressure of lubrication fluid, wherein the pressure of lubrication fluid is increased by the thrust dynamic pressure groove.

The pressure is weakened by loss, which occurs when pressure of the lubrication fluid propagates through the through hole, in comparison with a case of excluding such a through hole. In the case of the conventional motor, the through hole is formed so as to link both end sides of the sleeve. Therefore, a length of the through hole is relatively long, and the loss is relatively large.

Accordingly, it is necessary for the dynamic pressure groove to be formed larger so as to obtain prescribed force. As a result, dimensions of the motor are likely to be enlarged in some cases.

Further, action of the force differs from directions, that is, the approaching direction or the elongation direction, and following differences in characteristics may occur.

Rising pressure of the lubrication fluid caused by the thrust dynamic pressure groove depends on a rotational speed of the rotor. However, suction power of the magnet is independent of a rotational speed of the rotor.

Accordingly, it is hard to balance force that raises the rotor in response to a rotational speed of the rotor. In the case of manufacturing various kinds of motors of which a rotational speed differs from each other, each motor must be independently designed for appropriate performance.

Furthermore, the narrower a gap in a thrust dynamic pressure fluid bearing is, the more repulsive force or force of separating from each other that is generated by the thrust dynamic pressure groove increases. The narrower a gap between the magnet and the yoke is, the more suction power of the magnet increases.

In other words, as the hub approaches the motor base more, repulsive force between the hub and the motor base increases, and as the hub gets away from the motor base, the repulsive force weakens.

Accordingly, respective force in opposite directions, which are generated respectively in response to a degree of the gap in the thrust dynamic pressure fluid bearing, show a similar tendency to increase or decrease, so that it is hard to balance the respective force in the opposite directions. Therefore, it is hard for the respective force to be designed for optimum conditions.

In addition thereto, the through hole provided on the sleeve links the both end portions of the sleeve and must be pierced by a narrow orifice over a relatively long distance. Consequently, a drill bit that is small in diameter and long in length is necessary for a process to make the through hole. However, such a drill bit is easy to break. In order to make a through hole being small in diameter without breaking such a drill bit, boring the through hole must be performed at a reasonable processing speed.

Accordingly, productivity is hardly improved by increasing a processing speed.

SUMMARY OF THE INVENTION

Accordingly, in consideration of the above-mentioned problems of the prior arts, an object of the present invention is to provide a motor of which dimensions are not enlarged although the motor is provided with a dynamic pressure fluid bearing.

Further, the motor can be easily balanced in dynamic pressure, and exhibits stable characteristics.

Furthermore, the motor is high in productivity.

In order to achieve the above object, the present invention provides, according to an aspect thereof, a motor mounted with an improved dynamic pressure fluid bearing mechanism comprising: (a) a rotor, the rotor including (1) a shaft, (2) a hub in a cap shape having a cylindrical wall formed in an axial direction and fixed with the shaft, and (3) a thrust ring fixed on an inner circumferential surface of the cylindrical wall; (b) a stator, the stator including (1) a motor base, (2) an inner seal in a cylindrical shape fixed to the motor base, and (3) a sleeve fixed on an inner circumferential surface of the inner seal and provided with a flange section extending outward in a radial direction in an end portion side of the sleeve opposite to the motor base; wherein the thrust ring is disposed between the flange section and the inner seal in the axial direction, wherein the rotor is rotatable freely with respect to the stator through an improved dynamic pressure fluid bearing mechanism, and supported in a thrust direction by: a first thrust dynamic pressure fluid bearing constituted by one surface of the thrust ring, a surface of the flange section confronting with the surface of the thrust ring with having a first gap between them and lubrication fluid filled in the first gap; and a second thrust dynamic pressure fluid bearing constituted by the other surface of the thrust ring, an end surface of the inner seal confronting with the other surface of the thrust ring with having a second gap between them and the lubrication fluid filled in the second gap, and further supported in a radial direction by: a radial dynamic pressure fluid bearing constituted by an inner circumferential surface of the sleeve, an outer circumferential surface of the shaft confronting with the inner circumferential surface of the sleeve with having a third gap between them and the lubrication fluid filled in the third gap, wherein the improved dynamic pressure fluid bearing mechanism comprises: (a) the first thrust dynamic pressure fluid bearing; (b) the second thrust dynamic pressure fluid bearing; (c) the radial dynamic pressure fluid bearing; (d) the lubrication fluid; (e) a taper seal section constituted by the inner circumferential surface of the cylindrical wall and an outer circumferential surface of the inner seal for sealing in the lubrication fluid; (f) a main lubrication route for filling the lubrication fluid linking in series the taper seal section, the second gap, the first gap and the third gap in a sequential order; and (g) a bypass route linking an end of the third gap and an intermediate point between the second gap and the first gap in the main lubrication route; wherein the main lubrication route and the bypass route are filled with the lubrication fluid.

Other object and further features of the present invention will be apparent from the following detailed description when read in conjunction with the accompanying drawings.

DETAILED DESCRIPTION OF THE PREFERRED EMBODIMENTS

A motor mounted with an improved dynamic pressure fluid bearing mechanism according to an embodiment of the present invention is a motor for driving a hard disc installed in a hard disc drive (HDD) of which a rotational speed is 5400 rpm, for instance.

With reference to FIGS. 1-4, the motor mounted with an improved dynamic pressure fluid bearing according to the embodiment of the present invention is detailed next.

Figure 1:
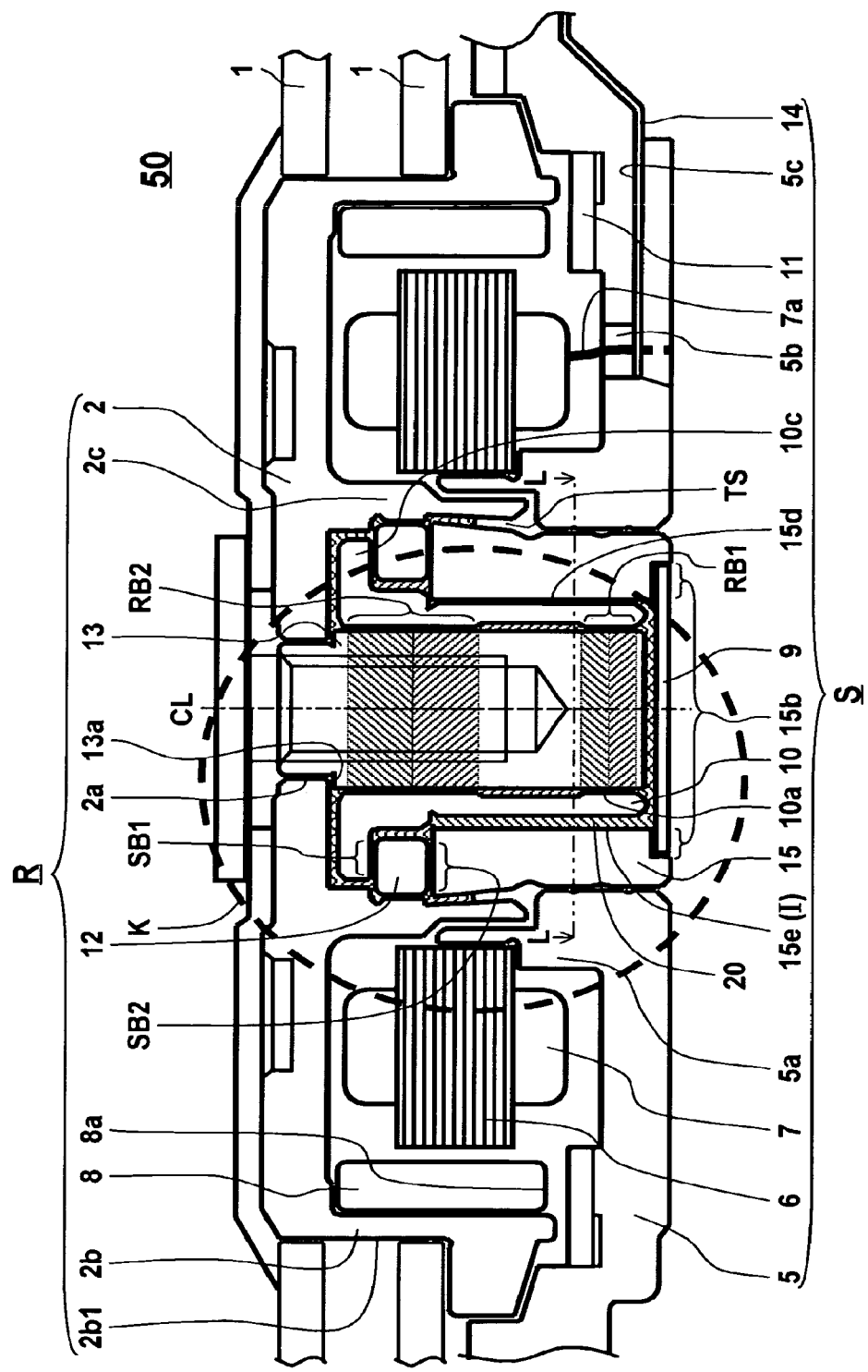
FIG. 1 is a cross sectional view of a motor mounted with an improved dynamic pressure fluid bearing mechanism according to an embodiment of the present invention.

FIG. 1 is a cross sectional view of a motor mounted with an improved dynamic pressure fluid bearing mechanism according to the embodiment of the present invention.

Figure 2:
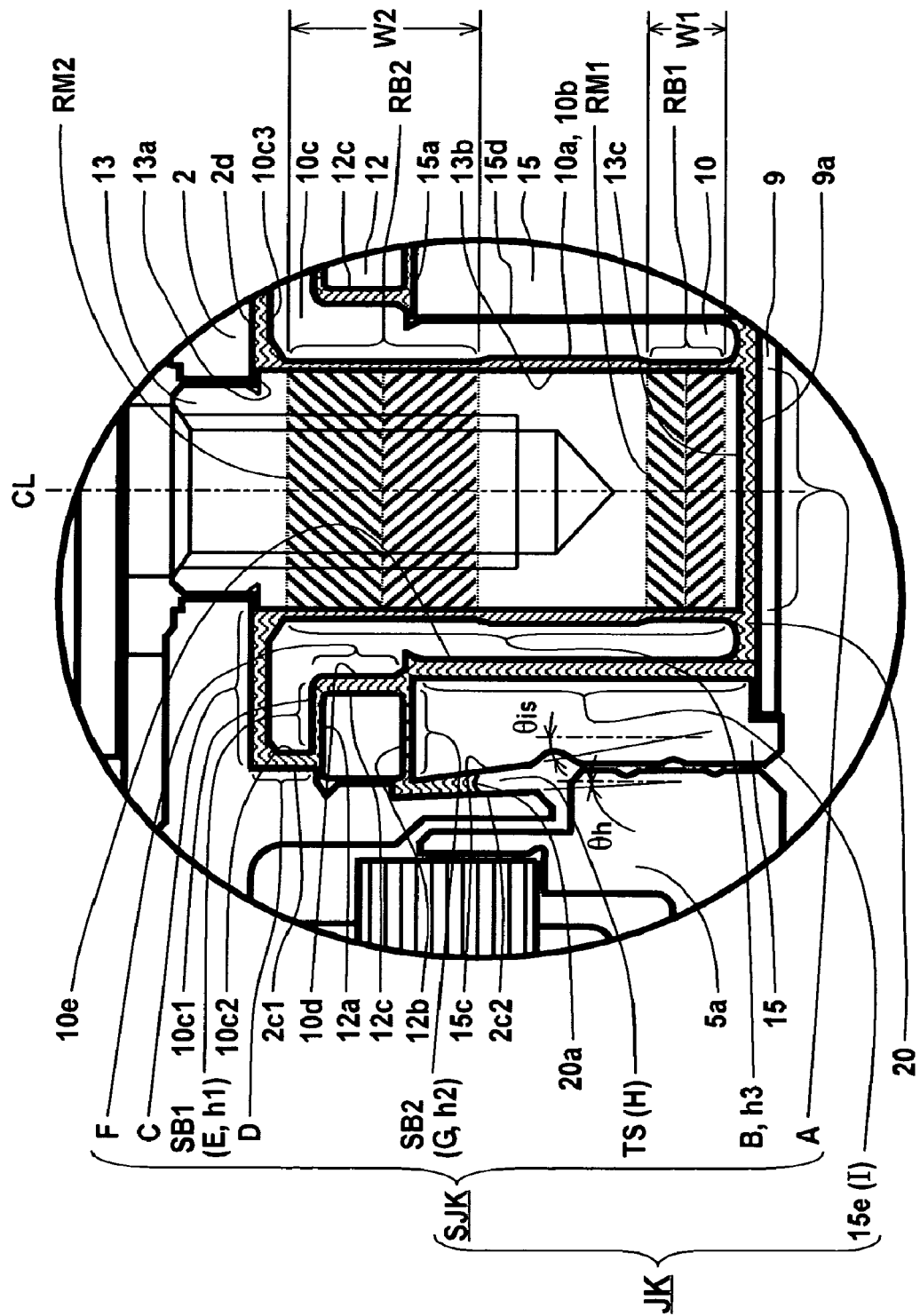
FIG. 2 is a partially enlarged cross sectional view of the motor with enlarging a circled area "K" in FIG. 1 showing a major part of the improved dynamic pressure fluid bearing mechanism.

FIG. 2 is a partially enlarged cross sectional view of the motor with enlarging a circled area "K" in FIG. 1 showing a major part of the improved dynamic pressure fluid bearing mechanism.

Figure 3:
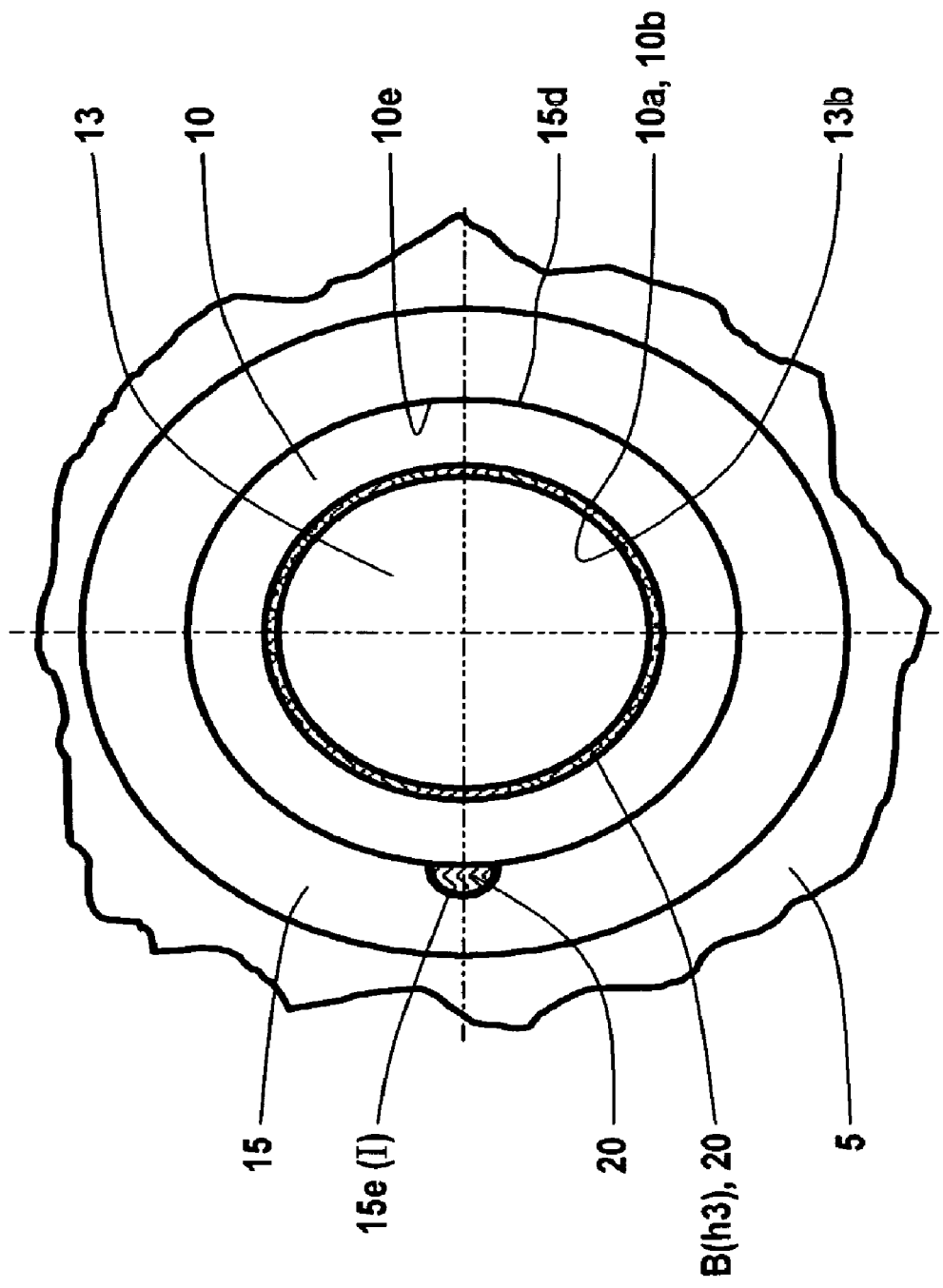
FIG. 3 is a cross sectional view of the motor taken along line L-L of FIG. 1.

FIG. 3 is a cross sectional view of the motor taken along line L-L of FIG. 1.

Figure 4:
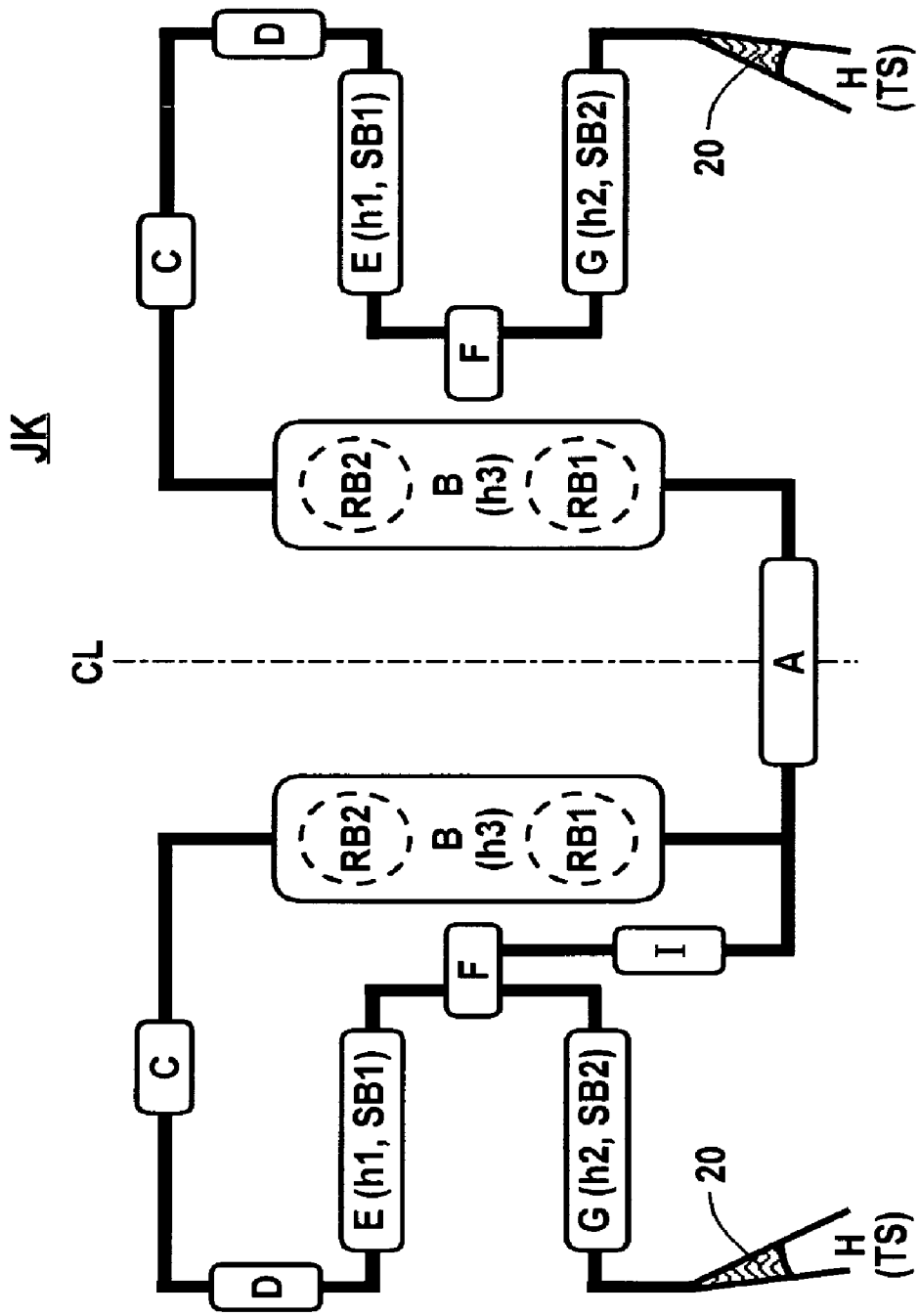
FIG. 4 is a view showing a frame format of a lubrication route to be filled with lubrication fluid in the motor shown in FIG. 1.

FIG. 4 is a view showing a frame format of a lubrication route to be filled with lubrication fluid in the motor shown in FIG. 1.

As shown in FIG. 1, a motor 50 according to the embodiment of the present invention is composed of a stator "S", a pair of radial dynamic pressure fluid bearings RB1 and RB2, a pair of thrust dynamic pressure fluid bearings SB1 and SB2, and a rotor "R", which is driven to rotate with respect to the stator "S" through these dynamic pressure fluid bearings RB1, RB2, SB1 and SB2.

With reference to FIGS. 1 and 2, description is given to the stator "S" first.

The stator "S" is constituted by a motor base 5, a core 6 that is fixed on an external circumferential surface of a cylindrical section 5a, which is provided on the motor base 5, an inner seal 15 in an annular shape that is fixed on an inner circumferential surface of the cylindrical section 5a by an adhering or a force fitting process, and a sleeve 10 in an annular shape having a through hole 10a that is fixed on an inner circumferential surface 15d of the inner seal 15 by an adhering or a force fitting process.

The motor base 5 is formed by cutting aluminum die-casting, or formed by pressing an aluminum plate or a nickel plated steel plate.

The core 6 is formed by laminating a magnetic material such as a silicon steel plate, and then surfaces of the core 6 are treated by insulation coating through a process such as electropainting and powder coating.

Further, the core 6 is formed in a ring shape and provided with a plurality of protruded poles protruding outward, which are not shown in the figure. A coil 7 is wound around each protruded pole. In case of driving the motor 50 by three-phase current, a number of protruded poles is designated to be nine.

A winding end 7a of the coil 7 is soldered on a flexible printed circuit board (FPC) 14, which is provided on a bottom surface 5c of the motor base 5, through a through hole 5b for the winding.

The FPC 14 is provided with a soldering section, which is not shown in the figure, for soldering the winding end 7a of the coil 7 and a land section, which is not shown in the figure but electrically connected to a not shown motor driving circuit installed in an HDD side, wherein the soldering section and the land section are electrically connected through a copper pattern.

The sleeve 10 is formed by using a material such as high tensile brass, copper based sintered alloy and stainless steel. One end portion of the sleeve 10 is formed with a flange section 10c that extends outward. In case of assuring higher reliability over a prolonged period, the sleeve 10 is preferable to be formed by an oil impregnated sintered alloy.

The inner seal 15 is formed by using a material such as high tensile brass, copper based sintered alloy that is treated by a process for sealing porosity, and stainless steel. A counter plate 9 is fixed to an open-end section 15b of the inner seal 15, and resulting in sealing the open-end section 15b hermetically.

Further, a recessed section or a groove 15e is formed on the inner circumferential surface 15d of the inner seal 15 along a center axis CL. The groove 15e is made to be a through hole that links both end surfaces of the inner seal 15 when the sleeve 10 is inserted into the inner seal 15. The through hole or the groove 15e is filled with lubrication fluid 20 and results in forming a bypass route "I" to be detailed later.

A cross sectional shape of the groove 15e is illustrated as a circular arc in FIG. 3. However, the shape is not limited to a circular arc. It shall be understood that any shape is acceptable as long as a surface of a recessed section hollows from the inner circumferential surface 15d of the inner seal 15.

Description is given to the rotor "R" next.

The rotor "R" is composed of a shaft 13, a hub 2 that is formed in approximately a cup shape and provided with a center hole 2a into which the shaft 13 is force fitted and fixed, and two cylindrical sections 2b and 2c, wherein the cylindrical sections 2b and 2c are disposed concentrically with respect to the center hole 2a and have individual diameters, a magnet 8 in a ring shape that is fixed on an inner circumferential surface of the cylindrical section 2b having a larger diameter (hereinafter referred to as "outer cylindrical section" 2b), and a thrust ring 12 that is fixed on an inner circumferential surface of the cylindrical section 2c having a smaller diameter (hereinafter referred to as "inner cylindrical section" 2c).

Further, in some cases, a yoke 11 is provided on the motor base 5 for applying magnetic action slightly to the rotor "R, wherein the yoke 11 confronts with a bottom surface 8a of the magnet 8.

Each member is detailed hereupon. The shaft 13 is made from a stainless steel material. A top end portion of the shaft 13 is formed with a stepped section 13a. By force fitting the shaft 13 into the center hole 2a of the hub 2 when the motor 50 is assembled, allocation of the hub 2 in the center axis CL direction is regulated by the stepped section 13a, and then the shaft 13 is integrated into the hub 2 within a prescribed perpendicularity.

The hub 2 is made from a magnetic stainless steel material. Two hard discs 1 are mounted on an outer circumferential surface 2b1 of the outer cylindrical section 2b of the hub 2.

The magnet 8 is made form a Nd—Fe—B (neodymium-iron-boron) system material and electropainting is applied on a surface of the magnet 8.

Further, an inner peripheral side of the magnet 8 is magnetized in twelve magnetic poles.

Furthermore, the bottom surface 8a of the magnet 8 confronts with the yoke 11 provided on the motor base 5.

In the motor 50 constituted by the rotor "R", the stator "S", and each of the dynamic pressure fluid bearings RB1, RB2, SB1 and SB2 as mentioned above, the shaft 13 assembled into the rotor "R" is inserted into the through hole 10a of the sleeve 10 of the stator "S". Then the rotor "R" is supported rotatable freely with respect to the stator "S" through each of the dynamic pressure fluid bearings RB1, RB2, SB1 and SB2.

In this configuration of the motor 50, dimensions of the shaft 13 are designed such that a tip end surface 13c confronts with the counter plate 9 with maintaining a prescribed gap between them.

Further, the hub 2 constitutes a magnetic circuit in conjunction with the core 6 and the magnet 8. Electric current is sequentially supplied to each coil 7 under control of a motor driving circuit provided externally, and then the rotor "R" is driven to rotate.

Succeedingly, the dynamic pressure fluid bearings, that is, the radial dynamic pressure fluid bearings RB1 and RB2 and the thrust dynamic pressure fluid bearings SB1 and SB2 are described in detail.

In FIG. 2, a dynamic pressure fluid bearing in the radial direction, that is, the radial dynamic pressure fluid bearings RB1 and RB2 are constituted by an outer circumferential surface 13b of the shaft 13, an inner circumferential surface 10b of the through hole 10a of the sleeve 10 and lubrication fluid 20, which is filled in a gap h3 between the outer circumferential surface 13b and the inner circumferential surface 10b, wherein the gap h3 is extremely narrow in fact although the gap h3 is illustrated with having a noticeable width in FIG. 2. The radial dynamic pressure fluid bearings RB1 and RB2 are provided in two areas that are isolated in the center axis CL direction: a first radial dynamic pressure fluid bearing RB1 provided in an area far from the hub 2 and a second radial dynamic pressure fluid bearing RB2 provided in another area near to the hub 2.

In each of the radial dynamic pressure fluid bearings RB1 and RB2, either one surface of the outer circumferential surface 13b and the inner circumferential surface 10b confronting with each other is formed with a dynamic pressure groove RM1 or RM2 for generating dynamic pressure. The dynamic pressure grooves RM1 and RM2 are formed in a shape such as herringbone.

When the rotor "R" rotates, the shaft 13 is supported by the dynamic pressure, which is generated by the dynamic pressure grooves RM1 and RM2, in the radial direction with respect to the sleeve 10 while maintaining the prescribed gap h3 between the shaft 13 and the sleeve 10.

Further, in the embodiment, as shown in FIG. 2, a width W1 of the dynamic pressure groove RM1 constituting the first radial dynamic pressure fluid bearing RB1 is formed narrower than a width W2 of the dynamic pressure groove RM2 constituting the second radial dynamic pressure fluid bearing RB2.

By this configurations of the first and second radial dynamic pressure fluid bearings RB1 and RB2, dynamic pressure that is applied to the shaft 13 and corresponds to side pressure of which strength varies in the axial direction, is generated in each of the radial dynamic pressure fluid bearings RB1 and RB2.

Accordingly, optimal balancing between higher bearing stiffness and lower bearing loss can be realized.

On the other hand, a dynamic pressure fluid bearing in the thrust direction is constituted by a first thrust dynamic pressure fluid bearing SB1 and a second thrust dynamic pressure fluid bearing SB2.

The first thrust dynamic pressure fluid bearing SB1 is constituted by a top surface 12a of the thrust ring 12 that is fixed to the hub 2, a bottom surface 10c1 of the flange section 10c of the sleeve 10, and the lubrication fluid 20 that is filled in a gap h1 between the top surface 12a and the bottom surface 10c1, wherein the gap h1 is extremely narrow in fact although the gap h1 is illustrated with having a noticeable width in FIG. 2. At least either one of the top surface 12a and the bottom surface 10c1 is formed with a thrust dynamic pressure groove for generating dynamic pressure, wherein the thrust dynamic pressure groove is not shown in the figure. The thrust dynamic pressure groove generates dynamic pressure directed toward a direction of so-called "pump-in" with respect to the lubrication fluid 20, and is formed in a shape such as herringbone. The dynamic pressure in the "pump-in" direction acts on the lubrication fluid 20 and increases pressure of the lubrication fluid 20 totally.

Further, the second thrust dynamic pressure fluid bearing SB2 is constituted by a bottom surface 12b of the thrust ring 12, a top surface 15a of the inner seal 15 and the lubrication fluid 20 that is filled in a gap h2 between the bottom surface 12b and the top surface 15a, wherein the gap h2 is extremely narrow in fact although the gap h2 is illustrated with having a noticeable width in FIG. 2. At least either one of the bottom surface 12b and the top surface 15a is formed with another thrust dynamic pressure groove for generating dynamic pressure, wherein the other thrust dynamic pressure groove is not shown in the figure. The other thrust dynamic pressure groove generates dynamic pressure in the "pump-in" direction with respect to the lubrication fluid 20 and is formed in a shape such as herringbone.

In the first and second thrust dynamic pressure fluid bearings SB1 and SB2, the thrust dynamic pressure groove and the other dynamic pressure groove generate respective dynamic pressure or force, which are directed reversely in the center axis CL direction when the rotor "R" rotates.

Further, dimensions of each member are set so as to balance the reversely directed force. Consequently, the rotor "R" is raised and supported with respect to the stator "S" while maintaining the prescribed gaps h1 and h2 among each member.

The lubrication fluid 20, which is filled in each gap in each of the dynamic pressure fluid bearings RB1, RB2, SB1 and SB2, is common to them and sealed in by a taper seal section TS to be detailed next. Consequently, the lubrication fluid 20 is prevented from leaking out externally by the taper seal section TS.

More specifically, the taper seal section TS is constituted by an outer circumferential surface 15c of the inner seal 15 and an inner circumferential surface 2c2 of the inner cylindrical section 2c of the hub 2.

The outer circumferential surface 15c of the inner seal 15 is an inclined plain. An outer diameter of the inner seal 15 within the inclined plain area gradually decreases in accordance with leaving from the top surface 15a side and approaching the counter plate 9 side. The inclined plain is formed at an angle θis of inclination with respect to the center axis CL.

On the other hand, the inner circumferential surface 2c2 of the inner cylindrical section 2c of the hub 2 is also an inclined plain. An inner diameter of the inner cylindrical section 2c within the inclined plain area gradually decreases in accordance with approaching an open-end side or the tip of the inner cylindrical section 2c. An angle θh of inclination of the inclined plain with respect to the center axis CL is set to be larger than zero and smaller than θis. In other words, the angle θh is "0<θh<θis".

Accordingly, the outer circumferential surface 15c and the inner circumferential surface 2c2 form the taper seal section TS, wherein a gap between them enlarges in accordance with approaching the open-end side of the inner cylindrical section 2c.

Further, a filling amount of the lubrication fluid 20 is regulated such that an interface between the lubrication fluid 20 and ambient air or a fluid level 20a of the lubrication fluid 20 remains in a middle of the taper seal section TS.

Accordingly, the lubrication fluid 20 is sealed in the taper seal section TS by the capillary action, and prevented from leaking out externally.

As mentioned above, the inner circumferential surface 2c2 as an outer inclined plain of the taper seal section TS is set such that the inner diameter of the inner cylindrical section 2c on the outer inclined plain gradually decreases in accordance with approaching the open-end side of the inner cylindrical section 2c. Therefore, centrifugal force, which conducts the lubrication fluid 20 in an inward direction toward an area filled with the lubrication fluid 20, that is, a lubrication route JK will be detailed later, acts on the lubrication fluid 20 when the rotor "R" rotates.

Accordingly, the lubrication fluid 20 is more surely prevented from leaking out externally.

Further, as mentioned above, the lubrication fluid 20 that is filled in the gaps constituting each of the dynamic pressure fluid bearings RB1, RB2, SB1 and SB2 is commonly used. In other words, each gap is linked by the lubrication route JK to be detailed next.

The lubrication route JK is a route for lubricating the lubrication fluid 20 into each route from an innermost route "A" to an outermost route "H" and the bypass route "I".

More specifically, in FIG. 2, each route is as follows:

an innermost route "A" is a gap between the tip end surface 13c of the shaft 13 and a top surface 9a of the counter plate 9, a route "B" is the gap h3 between the inner circumferential surface 10b of the sleeve 10 and the outer circumferential surface 13b of the shaft 13 and includes the first and second radial dynamic pressure fluid bearings RB1 and RB2, a route "C" is a gap between a top surface 10c3 of the flange section 10c of the sleeve 10 and a bottom surface 2d of the hub 2 inside the cylindrical section 2c, a route "D" is a gap between an outer circumferential surface 10c2 of the flange section 10c and an inner circumferential surface 2c1 of the cylindrical section 2c of the hub 2, a route "E" is the gap h1 constituting the first thrust dynamic pressure fluid bearing SB1, a route "F" is a gap between an inner circumferential surface 12c of the thrust ring 12 and an outer circumferential surface 10d of the sleeve 10, a route "G" is the gap h2 constituting the second thrust dynamic pressure fluid bearing SB2, and an outermost route "H" is the taper seal section TS.

The lubrication route JK is constituted by a main lubrication route SJK, which links in series the second thrust dynamic pressure fluid bearing SB2, the first thrust dynamic pressure fluid bearing SB1, the second radial dynamic pressure fluid bearing RB2 and the first radial dynamic pressure fluid bearing RB1 in a sequential order. In other words, the main lubrication route SJK is a route linking in series the gap h2, the gap h1 and the gap h3 in the sequential order and filled with the lubrication fluid 20.

In the embodiment, the bypass route "I", which directly links the innermost route "A" and the route "F", is provided in addition to the main lubrication route SJK. The bypass route "I" functions as a bypass of the main lubrication route SJK.

More specifically, the bypass route "I" is assured by the groove 15e that is formed on the inner circumferential surface 15d of the inner seal 15 along the center axis CL.

In FIG. 2, a diameter of the outer circumferential surface 10d of the sleeve 10 constituting the route "F" is made larger than that of an outer circumferential surface 1e of the sleeve 10 confronting with the inner seal 15. However, it is acceptable for these diameters to be arranged reversely. In this case, however, an area of the top surface 15a of the inner seal 15 that constitutes the second thrust dynamic pressure fluid bearing SB2 decreases when the diameter of the outer circumferential surface 10e is made larger than that of the outer circumferential surface 10d. Consequently, the diameter of the outer circumferential surface 10e is desirable to be smaller than that of the outer circumferential surface 10d.

In any case, it is just required for the bypass route "I" that one terminal of the bypass route "I" is connected to an intermediate point between the first thrust dynamic pressure fluid bearing SB1 and the second thrust dynamic pressure fluid bearing SB2.

A frame format of the lubrication route JK is shown in FIG. 4. As it is apparent from FIG. 4, in the motor 50 according to the embodiment of the present invention, both end sides of the first and second radial dynamic pressure fluid bearings RB1 and RB2, that is, both terminals of the route "B" are linked by the bypass route "I" by way of the routes "C", "D", "E" and "F". Therefore, dynamic pressure in the "pump-in" direction, which is generated by the first thrust dynamic pressure fluid bearing SB1, flows back to an upstream side or the route "D" side of the first thrust dynamic pressure fluid bearing SB1 through the bypass route "I" and the routes "B", "C" and "D".

Accordingly, the dynamic pressure is averaged, and resulting in maintaining pressure balance excellently.

Further, even in case dynamic pressure in each of the dynamic pressure fluid bearings RB1, RB2, SB1 and SB2 is unbalanced by disturbance caused by external force that is applied to the shaft 13 or the rotor "R", unbalanced pressure is immediately averaged and balanced.

Accordingly, a floating amount of the rotor "R" with respect to the stator "S" is stabilized, and resulting in realizing the motor 50 in higher reliability.

Furthermore, supporting the rotor "R" in the thrust direction with respect to the stator "S" is conducted only by the first and second thrust dynamic pressure fluid bearings SB1 and SB2. As a result, there exists no rotational burden by iron loss caused by magnetic suction between a yoke and a magnet as the conventional motor does. Consequently, a motor excellent in efficiency is possibly assured.

In addition thereto, the inner seal 15 of which a length in the axial direction is shorter than that of the sleeve 10 is provided outside that sleeve 10, and the bypass "I" or the groove 15e extending along the axial direction is formed in the inner seal 15.

Accordingly, a length of the bypass route "I" is short, so that forming the bypass route "I" is rather easy.

When assembling the motor 50 according to the embodiment of the present invention, the sleeve 10 is integrated into the inner seal 15 by adhering first, for instance, while the thrust ring 12 is sandwiched between the sleeve 10 and the inner seal 15. Then the thrust ring 12 is fixed to the hub 2 by adhering or force fitting when the shaft 13 that is fixed to the hub 2 is inserted into the integrated sleeve 10.

According to the present invention, dimensions of the motor are not enlarged although the motor is mounted with the improved dynamic pressure fluid bearing mechanism, and further dynamic pressure can be easily balanced.

Accordingly, the motor achieves specific effects such that characteristics of the motor are stable and higher productivity is possibly ensured.

While the invention has been described above with reference to a specific embodiment thereof, it is apparent that many changes, modifications and variations in configuration, materials and the arrangement of equipment and devices can be made without departing form the invention concept disclosed herein.

For instance, it is acceptable for a recessed section to be the bypass route "I" such as the groove 15e that the recessed section is formed on at least either one surface of the inner circumferential surface 15d of the inner seal 15 and the outer circumferential surface 10e of the sleeve 10, which confronts with the inner seal 15. However, it is also acceptable that such a recessed section is formed on both surfaces 15d and 10e.

Further, with respect to a number of the groove 15e, just one is effective for the bypass route "I". However, it is also acceptable that a plurality of grooves 15e is formed at an equal angular interval. In case of more than three grooves, particularly, deformation of members such as the sleeve 10 is dispersed furthermore, so that more than three is preferable for the number of the grooves 15e.

Furthermore, it is acceptable for the bypass route "I" to be formed by a through hole that is bored inside the inner seal 15 instead of the groove 15e. However, the groove 15e is more preferable than the through hole, because the groove 15e is easy to form and a thickness of the inner seal 15 is possibly thinned.

More, in the above-mentioned embodiment, it is described that the inner seal 15 and the counter plate 9 are formed individually. However, they can be formed integrally. In this case, the inner seal 15 is formed in a cap shape, and the shaft 13 is inserted into a dead-ended hole of the inner seal 15.

In addition thereto, in order to stabilize a characteristic of NRRO (Non Repetitive Run-Out) of the rotor "R", which is completely floated by the first and second thrust dynamic pressure fluid bearings SB1 and SB2 and rotates, the yoke 11 that confronts with the bottom surface 8a of the magnet 8 can be provided on the motor base 5 for applying magnetic action slightly to the rotor "R", not for magnetically absorbing the whole rotor "R". In this case, as a matter of fact, the characteristic of NRRO is sufficiently improved even though iron loss of the yoke 11 is a negligible degree of magnetic action against revolution of the rotor "R".

In the embodiment, description is given to a motor, which is installed in a HDD. However, the improved dynamic pressure fluid bearing mechanism according to the present invention can be mounted on any motor, which is installed in not only a HDD but also a laser beam printer (LBP) and other equipment.

In addition thereto, it will be apparent to those skilled in the art that various modifications and variations could be made in the motor and the disc drive apparatus field in the present invention without departing from the scope of the invention.

What is claimed is:

1. A motor mounted with an improved dynamic pressure fluid bearing mechanism comprising:
   (a) a rotor, the rotor including
      (1) a shaft,
      (2) a hub in a cup shape having a cylindrical wall formed in an axial direction and fixed with the shaft, and
      (3) a thrust ring fixed on an inner circumferential surface of the cylindrical wall;
   (b) a stator, the stator including
      (1) a motor base,
      (2) an inner seal in a cylindrical shape fixed to the motor base, and
      (3) a sleeve fixed on an inner circumferential surface of the inner seal and provided with a flange section extending outward in a radial direction in an end portion side of the sleeve opposite to the motor base;

wherein the thrust ring is disposed between the flange section and the inner seal in the axial direction, wherein the rotor is rotatable freely with respect to the stator through an improved dynamic pressure fluid bearing mechanism, and supported in a thrust direction by:

a first thrust dynamic pressure fluid bearing constituted by one surface of the thrust ring, a surface of the flange section confronting with the surface of the thrust ring with having a first gap between them and lubrication fluid filled in the first gap; and a second thrust dynamic pressure fluid bearing constituted by the other surface of the thrust ring, an end surface of the inner seal confronting with the other surface of the thrust ring with having a second gap between them and the lubrication fluid filled in the second gap, and further supported in a radial direction by:

a radial dynamic pressure fluid bearing constituted by an inner circumferential surface of the sleeve, an outer circumferential surface of the shaft confronting with the inner circumferential surface of the sleeve with having a third gap between them and the lubrication fluid filled in the third gap, wherein the improved dynamic pressure fluid bearing mechanism comprises:
(a) the first thrust dynamic pressure fluid bearing;
(b) the second thrust dynamic pressure fluid bearing;
(c) the radial dynamic pressure fluid bearing;
(d) the lubrication fluid;
(e) a taper seal section constituted by the inner circumferential surface of the cylindrical wall and an outer circumferential surface of the inner seal for sealing in the lubrication fluid;
(f) a main lubrication route for filling the lubrication fluid linking in series the taper seal section, the second gap, the first gap and the third gap in a sequential order; and
(g) a bypass route linking an end of the third gap and an intermediate point between the second gap and the first gap in the main lubrication route;

wherein the main lubrication route and the bypass route are filled with the lubrication fluid.

2. The motor mounted with the improved dynamic pressure fluid bearing mechanism claimed in claim 1, wherein the bypass route is constituted by a recessed section formed on either the inner circumferential surface of the inner seal or the outer circumferential surface of the sleeve.

* * * * *

UNITED STATES PATENT AND TRADEMARK OFFICE
CERTIFICATE OF CORRECTION

PATENT NO. : 7,489,059 B2
APPLICATION NO. : 11/592254
DATED : February 10, 2009
INVENTOR(S) : Teruyuki Yajima Page 1 of 1

It is certified that error appears in the above-identified patent and that said Letters Patent is hereby corrected as shown below:

Title Page, Item (73) Assignee, "VICTOR COMPANY OF JAPAN, LIMITED, YOKOHAMA (JP)" should read --ALPHANA TECHNOLOGY CO., LTD., SHIZUOKA (JP)--

Signed and Sealed this

Twelfth Day of October, 2010

David J. Kappos
*Director of the United States Patent and Trademark Office*